Figure 1:
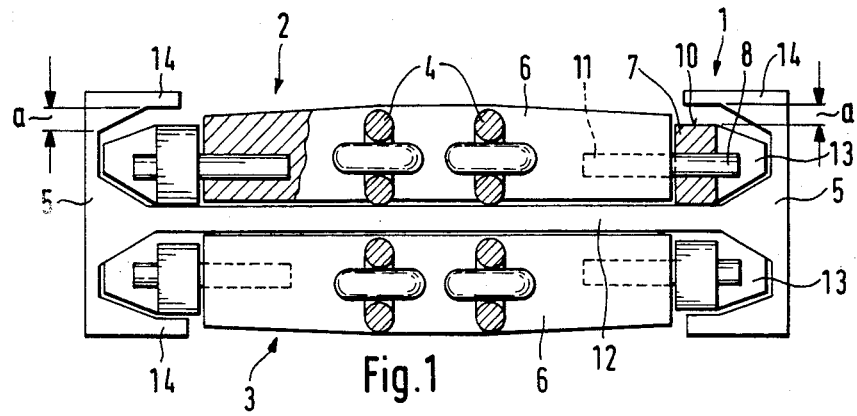

United States Patent [19]
Heising

[11] Patent Number: 4,815,586
[45] Date of Patent: Mar. 28, 1989

[54] CHAIN SCRAPER CONVEYOR

[75] Inventor: Ferdinand Heising, Werne, Fed. Rep. of Germany

[73] Assignee: Bergwerksverband GmbH, Essen, Fed. Rep. of Germany

[21] Appl. No.: 16,782

[22] Filed: Feb. 20, 1987

[30] Foreign Application Priority Data

Feb. 26, 1986 [DE] Fed. Rep. of Germany ....... 3606160

[51] Int. Cl.⁴ .............................................. B65G 19/06
[52] U.S. Cl. .................................... 198/727; 198/733; 198/734
[58] Field of Search ............... 198/716, 727, 729, 731, 198/733, 734, 838, 845

[56] References Cited

U.S. PATENT DOCUMENTS 777,377  12/1904  James ................................. 198/727

FOREIGN PATENT DOCUMENTS 561694  5/1977  U.S.S.R. ............................. 198/734
688748  3/1953  United Kingdom ................ 198/729

Primary Examiner—Joseph E. Valenza
Attorney, Agent, or Firm—Thomas S. Baker, Jr.

[57] ABSTRACT

A chain scraper conveyor having at least one conveyor chain circulating in the conveyor includes drivers which are secured to the chain and which extend from both sides thereof. The drivers include guides that are received in trough channels adjacent the bottom plate of the conveyor. Rollers are provided to support the drivers and to reduce friction.

6 Claims, 2 Drawing Sheets

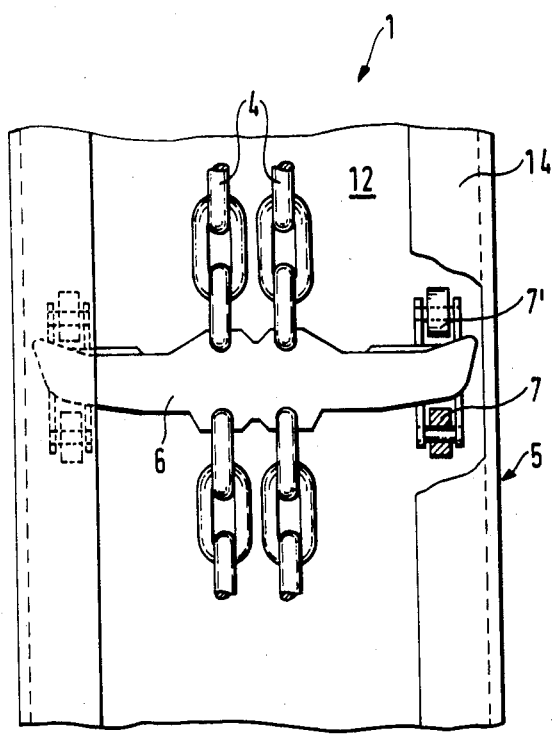
Fig. 4
Fig. 5
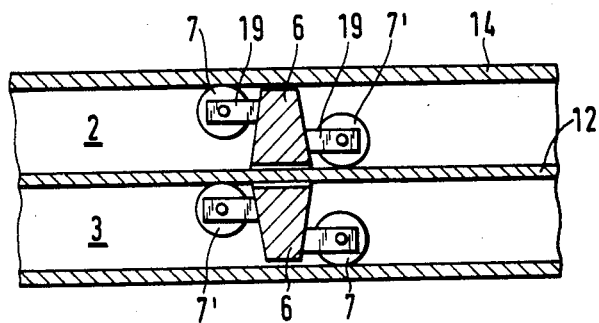

CHAIN SCRAPER CONVEYOR

The invention relates to a chain scraper conveyor comprising at least one conveyor chain circulating in the centre of the cnveyor and drivers which are secured to said chain, extend on both sides of the latter, are guided with the ends in the trough profiles of the conveyor on rollers and are provided with clearing means.

Chain scraper conveyors employed in mining, preferably in extraction working, because of their design of high strength suitable for mining purposes, being used to transport granular and abrasive material, have an extremely high power consumption because of the sliding friction between the chains and drivers or pushers on the one hand and the conveying troughs on the other hand.

At the same time, the sliding friction causes a considerable wear to the material because the drivers constantly scrape on the conveyor bottom or bottom plate and the ends of the drivers continuously slide in the trough profiles.

In recent years, the problem of increasing the operating life of the drivers, unsatisfactory due to the wear, in conjunction with chain conveyors led to a development, resulting from the increased requirements for example of the face length, the amount conveyed, the dead-weights of the chain assemblies, and in particular the increased rock component in the mine run, to the unsatisfactory solution of over-dimensioning of the chain assemblies, resulting in a necessarily high power consumption.

As apparent from DE-OS No. 2,621,247 it has already been proposed for reducing the friction to secure to each chain link of the endless conveyor chain at least one interchangeable sliding element which is formed as support and can be made for example from aluminium oxide ceramic, said element supporting the chain link on the sliding face of the housing bottom.

In addition, attempts have been made to reduce the resistances to movement in face conveyors, as shown in DE-PS No. 2,758,343, by icing the sliding faces of the conveyor and chain run as well as the guide elements over the entire face length using a safety refrigerant.

Finally, as apparent from DE-PS No. 844,572, corresponding to the preamble, attempts have been made to provide at the ends of the driver arms spherical or frusto-conical rollers running in the guide channels and to dispose in the direction of movement in front of said rollers the clearing plates engaging with adapted ends into the guide channels.

For costs reasons and due to the high material wear neither the icing of the construction elements forming together the sliding faces nor the securing of detachable sliding elements have led to any practicable result.

The provision of spherical or frusto-conical rollers guided in U-shaped channels was also unable to establish itself in practice. Due to the wedge angle and the different peripheral speeds proportional to the diameter the geometrical forms of the rollers led to jamming in the side sections or profiles. Furthermore, due to the close adaptation to the side profile the rollers tend to block because under the influence of finer accumulations and encrustations of conveyed material the rollers come into contact simultaneously with the upper and lower side faces of the lateral profile and consequently on occurrence of a corresponding sliding friction can no longer turn in any direction.

In the light of the foregoing the problem underlying the invention is to provide a chain scraper conveyor which proceeding from the use of rolling friction by means of rollers to be attached to the drivers or pushers permits an appreciable reduction in the friction and thus ensures a decisive saving in the energy consumption.

This problem is solved according to the invention in that spaced from the outermost trough profile at the end of each driver at lesat one roller is provided, the axis and/or bearing opening of which is arranged parallel to the running surface of the roller and the running track of which is disposed in the conveyor.

Within a particular further development of the invention it is found advantageous to provide spaced from the outer trough profile. cylindrical rollers which are adapted to be inserted into the drivers by means of gudgeons and run on the bottom plate and between the rollers and trough profile to provide guide elements adapted in spacing to the trough profile.

The geometrical form of the cylindrically formed rollers ensures a satisfactory rotation and thus the desired rolling friction and it is emphasized that on provision of a roller at the end region of each driver arm the vertical freedom of movement is necessary for the running of the rollers. The upper flange of the trough profile partially engaging over the rollers in the upper run is spaced from the rollers and forms in the lower run simultaneously the running face, a spacing between rollers and bottom plate again being necessary in the lower run.

According to a further development of the invention it is considered advantageous that the ends of the drivers adapted in spacing to the trough profiles widening towards the conveyor centre are each provided with a lower and an upper roller, the inclined faces in the trough profile being formed as running tracks parallel to the running surface of the rollers and their axes. Instead of cylindrically formed rollers it is possible to employ balls.

It is further conceivable within the scope of the invention to associate with each of the ends of the drivers two rollers such that the rollers are arranged on the driver diagonally offset in the conveyor longitudinal direction. The rollers run in the trough profile, the leading rollers in the conveying direction being secured to brackets and running beneath the upper flange of the trough profile and the trailing rollers running on the respective face of the trough profile adjacent the bottom plate, the rollers thus mutually supporting each other.

The arrangement of two rollers or balls at each driver end permits a continuous guiding at the inner faces of the trough sections or profiles, the constant use of clearing or scraper means, in particular in the trough profiles, being necessary for functionability.

The technical advance of the invention is substantiated in particular in that with the reduction of friction withing the conveying apparatus a considerable saving of installed power results, or alternatively on retaining the present drive powers the conveying lengths can be increased.

Figure 2:
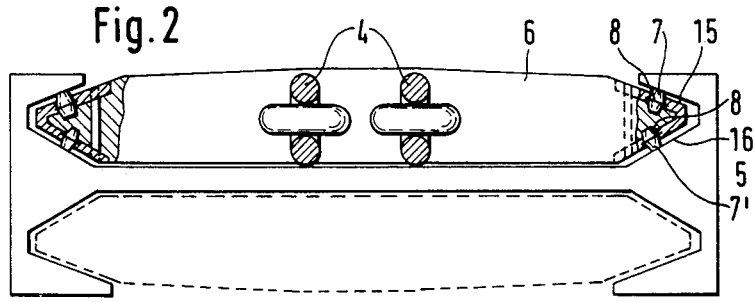
Figure 3:
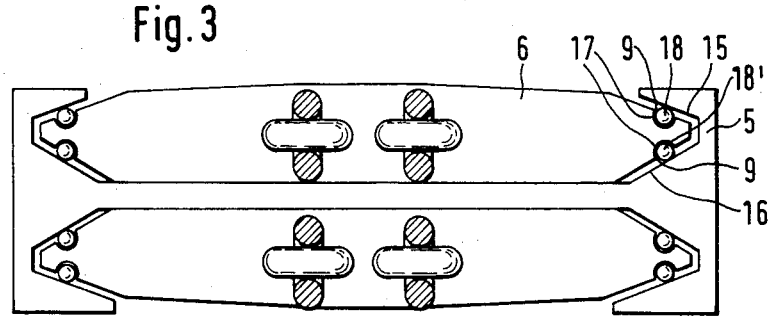

Several examples of embodiment of the invention will be explained hereinafter with the aid of the drawings, wherein:

FIG. 1 is a section through a conveyor constructed as double-centre chain scraper conveyor and having a ylindrical roller in the region of each of the drive ends, FIG. 2 shows a further example of embodiment of a double-centre chain scraper conveyor having two rollers in each case in the scraper ends, FIG. 3 shows an example of embodiment of a double-centre chain scraper conveyor with running balls, FIG. 4 is a plan view of a driver or pusher with leading and trailing rollers and FIG. 5 is a side view according to FIG. 4.

The example of embodiment illustrated in FIG. 1 shows a conveyor 1 in section comprising a double-centre chain 4 whose pushers or drivers 6 extending on both sides into the trough profiles or channel sections 5 are carried at a slight spacing from the bottom plate 12 by rollers 7 disposed in the end regions. The gudgeons 11 are formed simultaneously as axes 8 for the rollers 7 and carry at the ends guide elements 13 adapted in slight spacing to the trough profile 5. The rollers 7 are made cylindrical and have a running surface 10 parallel to the axis 8 and to the track in the bottom plate 12. The trough profile 5 is so formed that the upper flange 14 partially engaging over the rollers 7 has a spacing a with respect to the rollers 7. In contrast to the upper run 2 the lower flange 14 forms in the lower run 3 the running surface for the rollers 7.

In the example of embodiment illustrated in FIG. 2 the ends of the drivers 6 are each provided with two rollers 7, 7' whose axes 8 and running surfaces 10 are disposed parallel to the surfaces 15 and 16 of the slightly modified trough profile 5.

In the example of embodiment illustrated in FIG. 3 the continuous contact is obtained by balls 18, 18' accommodated in bearings 17 disposed at the ends of the pushers or drivers 6. The balls 18, 18' are fixedly mounted in the drivers 6 and surrounded by a material which has a smaller coefficient of friction than the material of the conveyor or the material conveyed.

FIGS. 4 and 5 show an example of embodiment of a chain scraper conveyor in which at the ends of the drivers 6 in each case two rollers 7, 7' are provided.

As apparent in particular from FIG. 5 the rollers 7, 7' are arranged on the driver 6 by means of brackets 9, 10 diagonally offset in the conveying direction. The roller 7 is the leading roller in the conveying direction and guided beneath the upper flange 14 whereas the trailing roller 7' is guided on the bottom plate or the face of the side profile 5 closer to the bottom plate 12.

I claim:

1. A trough type chain scraper conveyor adapted to travel in a trough channel on each side of a bottom plate between said bottom plate and an upper or lower flange on each sidewall of said trough channel which overlies or underlies and forms a portion of the upper or lower trough channel comprising at least one conveyor chain circulating in the center of the conveyor and drivers which are secured to said chain at spaced intervals and which extend from both sides of said chain, said drivers including rollers supporting said drivers and said drivers being adapted to be guided in said trough channels characterized by guide elements secured to each end of said drivers, each of said trough channels having sidewalls portions that are angled from said bottom plate, wherein said guide elements are adapted to be received in said said angled portion of said trough channels to thereby guide said drivers, said rollers being positioned on said drivers between said guide elements and the midpoint of said drivers, said rollers resting on said bottom plate inwardly of said angled portion of said trough channels when said chain scraper travels in the upper trough channel, said upper flange overlies a portion of said rollers when said chain scraper travels in said one direction, and a vertical spacing being provided between said rollers and said upper flange to ensure that rotational movement of said rollers is not hindered.

2. A chain scraper conveyor according to claim 1, characterized by said guide elements having external surfaces complementary to said trough channels.

3. A chain scraper conveyor according to claim 1, characterized in that a portion of said rollers rest on said lower flange when said chain scraper travels in the lower trough channel.

4. A chain scraper conveyor according to claim 1, characterized by said rollers being rotatable about axes parallel to said bottom plate.

5. A chain scraper conveyor according to claim 1, characterized in that gudgeons affixed to said drivers mount said rollers.

6. A chain scraper conveyor according to claim 5, characterized in that said gudgeons which mount said rollers also mount said guides.

* * * * *